Oct. 18, 1949.   N. E. DILLOW   2,485,367
GROUND-FAULT NEUTRALIZER BY-PASS
SWITCH REOPENING EQUIPMENT
Filed June 30, 1948
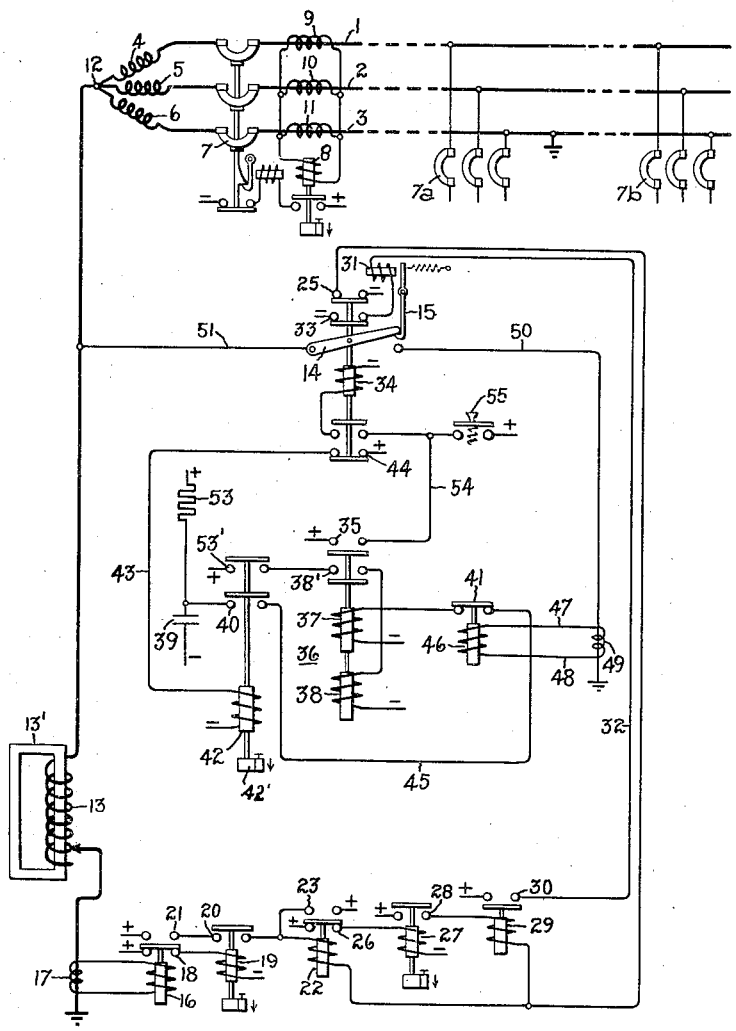
Inventor:
Noel E. Dillow,
by Ernest C. Britton
His Attorney.

Patented Oct. 18, 1949

2,485,367

UNITED STATES PATENT OFFICE 2,485,367

GROUND-FAULT NEUTRALIZER BY-PASS SWITCH REOPENING EQUIPMENT

Noel E. Dillow, Schenectady, N. Y., assignor to General Electric Company, a corporation of New York Application June 30, 1948, Serial No. 36,108

7 Claims. (Cl. 171—97)

The invention relates to ground fault neutralizer systems, particularly of the type wherein a fault to ground on one phase conductor of a polyphase power distribution system immediately increases the capacitive current to ground of the ungrounded phase conductors of the system and wherein a neutral point of the system is grounded through a so-called neutralizer comprising a specially proportioned reactance capable of providing a neutralizing inductive or lagging current for immediately suppressing capacitive ground fault currents of a transient or temporary character without requiring the operation of any of the selectively-timed automatic circuit breakers and control relays protecting the various parts of the system against sustained faults.

In order to enable the selectively-timed fault protective automatic relays to operate the proper circuit breakers to disconnect or isolate a sustained ground fault in any part of the system, as well as to take care of open circuit faults, it is necessary promptly to by-pass the ground fault neutralizing reactance by closing a by-pass switch connecting the system neutral directly to ground whenever a substantial fault current flows through the neutralizer reactance for a sufficient time that is long enough to indicate that the fault is not of a transient or temporary character.

However, when the circuit breakers that disconnect or isolate the various parts of the power system are of the automatically timed reclosing type it is desirable to reopen the by-pass switch just as soon as the circuit breakers effectively isolate a sustained fault or clear a non-transient fault and thereby restore the effectiveness of the neutralizer reactance to neutralize other transient ground faults on other parts of the system after the non-transient fault is cleared or while the sustained fault is isolated. Thus in case of a succession of various kinds of ground or open circuit faults on different parts of the system such as may occur during a severe lightning or wind storm proper timing of the closing and opening of the neutralizer by-pass switch is required in each case for effectively protecting against the transient ground faults that can be immediately neutralized and the non-transient faults that will require timed circuit breaker clearing or isolation. As the by-pass switch timing control requirements may be repeated upon each reclosing of differently timed circuit breakers protecting different parts of the system, the ground fault neutralizer by-pass switch timing control necessarily must operate under widely variable conditions.

In the ground fault neutralizer system disclosed and claimed in the Light Patent 2,421,630 assigned to the present assignee, a motor-operated multiple cam contact timing mechanism is started into operation upon the closure of the neutralizer by-pass switch for automatically reopening the switch under suitable coordinated conditions at fixed time intervals for a limited number of times in order to provide successive intervals wherein the automatic selectively-timed ground fault relays can operate properly in selectively controlling the reclosing circuit breakers protecting the various parts of the system. However, some difficulties may be encountered in applying such a relatively fixed time repeating by-pass switch reopening cycling control to power systems having selective isolating circuit breakers successively reclosing in different lengths of time with which the by-pass switch reopening cycling timing control must be coordinated to avoid interference or unnecessary delays in protecting the system.

One of the objects of the present invention is to provide an improved automatic self-synchronizing form of automatic ground fault neutralizer by-pass switch timing control whereby the closing and reopening thereof may be more effectively controlled no matter what faults may occur or what the resulting timed operation of the various disconnecting and isolating circuit breakers of the power system under the control of the automatic selectively-timed fault responsive relays associated therewith may be.

Another object is to provide a ground fault neutralizer by-pass switch timing control wherein the by-pass switch is automatically closed whenever a predetermined current flows through the neutralizer for a predetermined time interval and special time delay means is synchronized upon each opening of the by-pass switch to become effective a predetermined time interval thereafter for reopening the by-pass switch when the by-pass current falls below a predetermined value. Thus the improved self-synchronizing double time delay control system automatically controls the closing and opening of the neutralizer by-pass switch to provide effective operation of the neutralizer whenever possible under transient fault conditions on the system while at the same time enabling the automatic circuit breakers and selectively-timed control relays therefore to operate most effectively to clear or isolate sustained faults on different parts of the system.

The single figure of the accompanying drawing diagrammatically illustrates an embodiment of my invention as applied to a three-phase alternating current electric system of the type wherein a fault to ground on any phase conductor of the system substantially increases the capacitive current to ground of the ungrounded phase conductors. As shown, the system includes a transmission and distribution line comprising phase conductors 1, 2 and 3 which are arranged to be connected to a three-phase source comprising windings 4, 5 and 6 by suitable circuit interrupting means such as a circuit breaker 7. It will, of course, be understood by those skilled in the art that the system may comprise other sources and lines interconnecting the various stations and suitable interrupting means like the circuit breakers 7a, and 7b, for example, for disconnecting the lines from the station buses on the occurrence of faults.

For controlling the opening of the circuit breaker 7 and such other circuit breakers as the system may comprise through their trip coils 7', suitable relaying means responsive to ground faults are provided. As illustrated, these relaying means comprise simple overcurrent relays 8, examples of which are well-known to the art. To respond to ground faults, the relay 8 may be connected to be energized in accordance with the sum of the currents in the line conductors at the relay location. This may be done by connecting the windings of the relay across parallel connected current transformers 9, 10 and 11, respectively associated with the phase conductors 1, 2 and 3.

The windings 4, 5 and 6, which may be those of a power transformer, are shown Y-connected with the associated line 1—2—3 to provide a neutral point 12 which may be used for grounding purposes, but neutral points otherwise suitably derived may be used as will be obvious to those skilled in the art. The neutral point 12, as well as other neutral points, not shown, on the system, whether grounded through impedance devices or not, are arranged to be connected to ground to establish a predetermined grounding of the system to accord with the prearranged settings of the ground fault protective relays 8 so as to insure the desired selectivity of relaying operation, for example, as disclosed in United States Letters Patent 2,258,248. Inasmuch, however, as it is desirable to clear as many ground faults as possible without circuit breaker operation, at least one of the neutral points of the system such, for example, as the neutral point 12, and possibly others depending on the extent of the system and also whether or not the system may at times be operated as a divided system, are grounded through suitable arc suppressing apparatus such as a ground fault neutralizer 13 after the manner and for the purpose disclosed in United States Letters Patent 1,537,371.

The ground fault neutralizer reactance 13 is provided with a magnetic core 13' to form an impedance device whose zero phase sequence inductive reactance is such as to provide on the occurrence of a ground on a phase conductor of the system a lagging current for effectively suppressing all or part of the capacitance current to ground at the fault. In the event that the system is to be operated in separated parts at times or involves long lines, more than one neutralizer may be provided, and these will have their inductive reactances proportioned to match that portion of the system to which they apply. In other words, whether there is more than one neutralizer reactance or not, the neutralizers are proportioned depending upon the amount of the system in service to provide enough neutralizing lagging current to suppress the capacitance current to ground of the ungrounded phase conductors of the system on the occurrence of a ground fault, which if of a transient character will be eliminated by this suppressing action.

When the ground fault is not of a transient character, however, resort is had to selectively-timed circuit breaker operation for isolating the faulty portion of the system without disturbing continuity of service on sound portions. In this case, it is necessary to rely upon the ground fault relay 8 and other ground fault relays of the system, but their action as heretofore pointed out can only be selective for that predetermined grounding of the system for which prearranged relay settings are made, all as set forth in United States Letters Patent 2,258,248, supra. Accordingly, to effect a solid grounding of the system a predetermined time after the occurrence of a ground fault, for example, a ten-second interval, sufficient for the ground fault neutralizer 13 to suppress the fault if of a transient character, arrangements are made for establishing a shunt connection to ground around the ground fault neutralizer 13 and other neutral points to establish a solid connection to ground. These solid connections to ground may be established in any suitable manner, but as shown they may be accomplished by closing a normally open by-pass switching means 14 a predetermined time after the beginning of a predetermined current flow in the ground fault neutralizer 13 and likewise at other neutral points.

The particular type of grounding switch employed and the way in which the grounding switches are operated to establish the solid ground connections or by-pass the ground fault neutralizers may be varied, but I have shown an arrangement such as disclosed in United States Letters Patent 2,296,109, issued September 15, 1942. Thus, as shown, the grounding switch 14 is a normally latched open biased to close switch and the tripping of the latch 15 is effected by a suitable time delay means initiated by the operation of a relay 16. This relay 16 is operative in response to a predetermined current flow through the ground fault neutralizer 13 and may be connected to be energized from a current transformer 17 in series therewith, as shown. The normally closed contacts 18 of the relay 16 maintain the energizing circuit of a time delay dropout relay 19, which may be of the induction disk alternating current type, examples of which are well known in the art.

When the relay 19 closes its contacts 20 while the relay 16 is energized with its contacts 21 closed, the circuit of an auxiliary relay 22 is completed through a conductor 24 and b auxiliary switch contacts 25 on the grounding switch 14. This auxiliary relay 22 through its normally closed contacts 26 completes the circuit of a second time delay dropout relay 27 and, when energized, completes its own circuit through its normally open contacts 28 and opens the circuit of the relay 27. When the second time delay relay 27 drops out, the closing of its normally open contacts 28 completes the circuit of a tripping relay 29 through the conductor 24 and the b auxiliary switch contacts 25. When this relay picks up to close its normally open contacts 30, a predetermined time interval after effective energization of relay 16, usually less than 10 seconds, it completes the circuit of the grounding switch trip coil 31 through a conductor 32 and the b auxiliary switch contacts 33 on the grounding switch. Thus energization of the trip coil 31 effects the release of the spring biased latch 15 to cause the closing of the by-pass switch 14 upon a predetermined current flow through the reactance 13 for a predetermined time interval.

If there is only neutral point on the system metallically connected to the circuit 1—2—3, the relays 27 and 29 may be omitted and the relay 22 arranged to do the tripping. If, however, there are two or more neutral points to be grounded, then any differences in timing of the relays 19 at different locations, which resulted in the closing of one grounding switch before the closing of the others, could prevent the closing of the others if only one time delay relay 19 were used since the relays 16 would drop out with the closing of the grounding switch thus reenergizing the associated relays 19. The second timing relay 27 prevents this since no grounding switch can be closed automatically until after all of the time delay relays 19 have properly functioned.

For restoring the grounding switch 14 to its open position, it may be provided with suitable opening means indicated as an electromagnet winding 34 whose circuit is controlled by the contacts 35 of a control relay 36. As illustrated, the control relay 36 is of the double coil type having a pick-up coil 37 and a seal-in or holding coil 38. The pick-up coil 37 is a relatively sensitive low-watt coil connected to be energized by the discharge of the timing condenser 39 when the contacts 40 and 41 are both closed to complete the condenser discharge circuit through conductor 45. The contact 40 is operated by a relatively short time element relay 42 that is energized through conductor 43 each time the neutralizer by-pass switch 14 is opened as shown and the auxiliary contact 44 thereof is closed. Under these conditions relay 42 holds contact 40 in the open position in which it is shown.

Contact 41 is operated by an electroresponsive relay 46 energized through the conductors 47 and 48 from a current transformer 49 that is responsive to the current in the by-pass circuit established through the ground conductor 50 and conductor 51 that connect the by-pass switch 14 in shunt with neutralizer 13. The relay 46 is calibrated to open the contact 41 when the current through the by-pass circuit exceeds a predetermined value and to reclose only when the current in the by-pass circuit falls below the predetermined value.

The condenser 39 is connected to be charged from a suitable D.-C. source indicated as plus and minus through the resistor 53 that is proportioned to provide a predetermined time interval for charging the condenser. However, when contacts 40 and 41 are closed to discharge the condenser 39 through the pick-up coil 37, then the resistor 53 serves as a current limiting resistor so as to maintain the current in the discharge circuit below the value to which the pickup coil 37 is effectively energized to pick-up relay 36 and thereby close contacts 35 and 38'.

Operation

With the by-pass switch 14 latched in the open position as shown, the neutralizer 13 is normally effective to neutralize any capacitive ground current that may flow when any transient ground G occurs on any of the line conductors 1, 2 or 3 so as to quickly extinguish the arcing and permit the transient ground to clear. However, as soon as the current flowing through the neutralizer reactance 13 exceeds a predetermined value, the neutralizer current responsive relay 16 responds to start the timing action provided by the successively energized and deenergized relays 19, 22, 27 and 29 so as to close the contact 30 and thereby effectively energize the trip coil 31 to release latch 15 and thereby effect the closing of the by-pass switch 14. Since closure of switch 14 shunts through conductors 50 and 51 the ground current in the system without any appreciable reactance in the circuit, the by-pass current responsive relay 46 immediately is energized to open is contact 41. Upon the closure of by-pass switch 14, contact 44 is open to deenergize relay 42 which in a relatively short time interval determined by the timing device 42' closes contact 40 and thereby places the discharge of condenser 39 under the control of the by-pass current responsive relay 46. Hence, as soon as the by-pass current through conductors 50 and 51 and the closed by-pass switch 14 decreases below a predetermined value which may be a widely variable time interval, contact 41 will close. This immediately results in discharging condenser 39 through the pick-up winding 37 of relay 36 to effect closure of the contacts 35 and 38' thereof. The contact 38' immediately establishes an energizing circuit for the seal-in or holding winding 38 through the contact 53 of relay 42 while contact 35 establishes an energizing circuit through conductor 54 and contact 55 for energizing the opening winding 34 of the by-pass switch 14. In this way the by-pass switch 14 is re-opened as soon as the by-pass current falls below a predetermined value. Such reduction in the by-pass current will occur as soon as one of the automatic circuit breakers 7, 7a or 7b, as the case might be, opens in order to isolate the particular section of the alternating current system on which the ground fault has occurred. Consequently, the neutralizer 13 is rendered effective to take care of any other transient ground faults that may occur on the system while the section having a sustained ground fault thereon is isolated.

Upon each opening of the by-pass switch 14, contact 44 closes to energize relay 42 and thereby reopen its contacts 40 and 53. The opening of contact 40 immediately sets into operation the charging circuit for the condenser 39 and the resistor 53 is so proportioned that about 15 seconds is required before condenser 39 is charged up sufficiently to again effectively energize the pick-up winding 37 when the discharge circuit is closed. Consequently, in case one of the circuit breakers 7, 7a, 7b should reclose after a relatively short time interval and reestablish the flow of ground current through the neutralizer 13, then the train of closing timing relays 16, 19, 22, 27, 29 is again set into operation to reclose the by-pass switch 14. If, upon reclosure of switch 14, the circuit breaker again opens and reduces the current through the closed by-pass switch sufficiently to reclose relay 46 within a time interval shorter than the charging time required for condenser 39, then the condenser will be unable to effectively energize the pickup coil 37 and the by-pass switch 14 will remain in the closed position. Thus to obtain this selective action, the charging time of the condenser 39 must be longer than the time interval provided by the changeover relays 16, 19, 22, 27 and 29.

The principal function of the relatively short time interval device 42 is to insure that the by-pass current responsive relay 46 has sufficient time to open before the discharge circuit of the condenser 39 is placed under the control of the relay 46. Otherwise the condenser might discharge directly through the contact 41 before the relay 46 had time to open contact 41 in response to an excessive flow of current through the by-pass.

Since under the condition just assumed the by-pass switch 14 remains closed, the discharge circuit of condenser 39 prevents effective charging thereof. Consequently, in order to reopen the by-pass switch 14 under these conditions, a manually operated switch 55 is provided for separately energizing the reopening winding 34.

What I claim as new and desire to secure by Letters Patent of the United States is:

1. In combination, a neutral grounding reactance for suppressing transient ground faults in a polyphase power system, a by-pass switch therefor, automatic closing means for the switch including an electroresponsive time delay device effective as soon as the switch is opened for reclosing the switch in response to a predetermined current flow through the reactance for a predetermined time interval and automatic opening means for the switch including an electroresponsive time delay device effective only when the switch remains open for a longer interval than said predetermined time interval for reopening the switch in response to a decrease of the by-pass current below a predetermined value.

2. In combination a neutral grounding reactance for suppressing transient ground faults in a polyphase power system, a by-pass switch therefor, electroresponsive time delay means for closing the by-pass switch upon a predetermined current flow through the reactance for a predetermined time interval, electroresponsive means for reopening the by-pass switch as soon as the by-pass current falls below a predetermined value, and synchronizing means responsive to the opening of the switch for rendering the reopening means ineffective for a longer time interval than said predetermined time interval.

3. In combination, a neutral grounding reactance for suppressing transient ground faults in a polyphase power system, a by-pass switch therefor, electroresponsive timing means connected to be energized upon each opening of the switch for reclosing the switch upon a current flow through the reactance above a predetermined value for a predetermined time interval, electroresponsive control means connected to be energized in response to flow of current through the by-pass switch, and means including a time delay electrical device connected to be energized upon each opening of the switch to become effective a time interval thereafter for reopening the switch under the control of said control means when the by-pass current falls below a predetermined value.

4. In combination, a neutral grounding reactance for suppressing transient ground faults in a polyphase power system, a by-pass switch therefor, electroresponsive means responsive to a predetermined current through the reactance and having time delay means operated thereby for closing the by-pass switch whenever the predetermined current exists for a predetermined time interval, electroresponsive control means responsive to the by-pass current through the closed by-pass switch, and time delay means set into operation upon each opening of the by-pass switch to become effective after an interval longer than said predetermined time interval for reopening the by-pass switch under the control of said means when the by-pass current falls below a predetermined value.

5. In combination, a neutral grounding reactance for suppressing transient ground faults in a polyphase power system, a by-pass switch therefor, electroresponsive means responsive to a predetermined current through the reactance and having time delay means for closing the by-pass switch when the predetermined current exists for a predetermined time interval, means responsive to the resulting by-pass current through the by-pass switch, and means including a capacitor having a charging circuit energized upon each opening of the by-pass switch to become effectively charged after an interval longer than said predetermined time interval and connected to be discharged under the control of said by-pass current responsive means for reopening the by-pass switch when the by-pass current falls below a predetermined value.

6. In combination, a neutral grounding reactance for suppressing transient ground faults in a polyphase power system, a by-pass switch for shunting the reactance, separate electroresponsive devices for opening and closing the switch, means including a relay responsive to a predetermined current through the reactance and time delay means operated under control of said relay for energizing the switch closing device when the predetermined current flows through the reactance for a predetermined time interval, and means including a relay responsive to the by-pass current through the switch and a time delay electric device connected to be energized upon each opening of the switch to become effective a time interval thereafter for energizing the switch opening device under the control of the relay when the by-pass current falls below a predetermined value.

7. In combination, a neutral grounding reactance for suppressing transient ground faults in a polyphase power system, a by-pass switch for shunting the reactance, separate electroresponsive devices for opening and closing the switch, means including a relay responsive to a predetermined current through the reactance and time delay means operated under control of said relay for energizing the switch closing device when the predetermined current flows through the reactance for a predetermined time interval, a condenser having a time delay charging circuit and means including a normally closed time delay switch connected to be energized upon each opening of the by-pass switch and operable with a time delay upon a deenergization thereof when the by-pass switch closes to the closed position and a normally closed relay operated to the open position upon a flow of by-pass current through the switch above a predetermined value for jointly completing a discharge circuit for the condenser to effectively energize the by-pass switch opening device as soon as the by-pass current falls below the predetermined value after a predetermined effective condenser charging time following each opening of the by-pass switch.

NOEL E. DILLOW.

No references cited.